Figure 1:
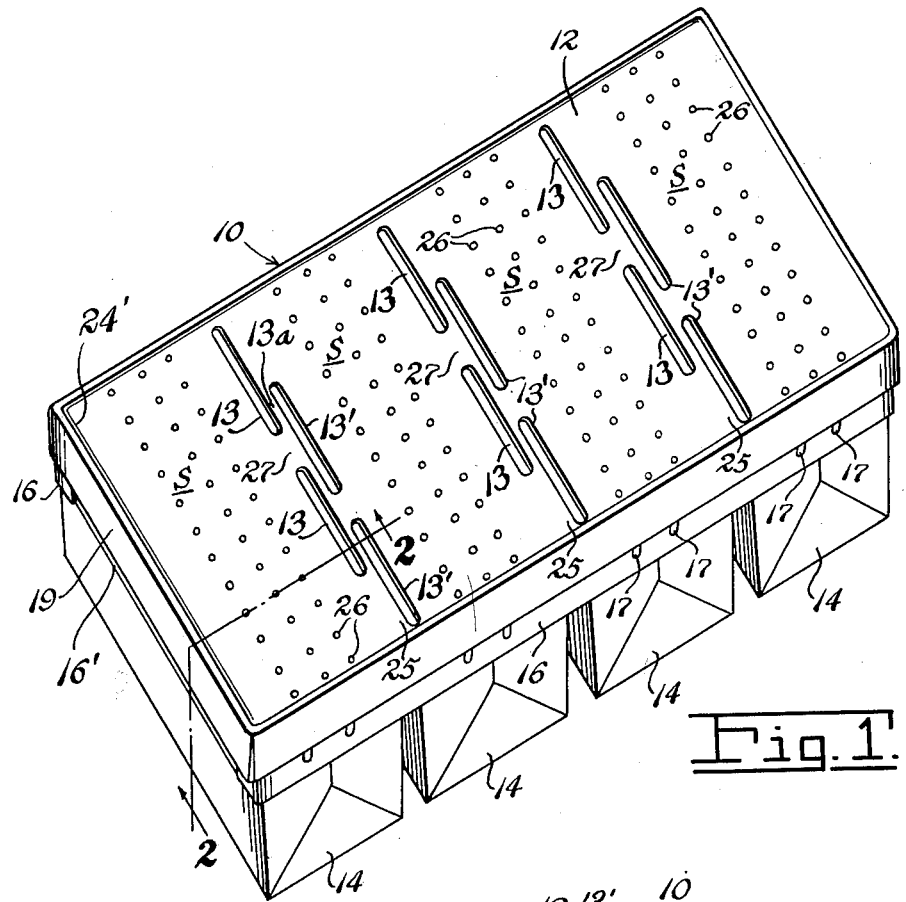

June 17, 1952  J. L. DARNELL  2,601,099
COVER FOR BAKE PAN UNITS
Filed June 9, 1949

INVENTOR.
JESSE L. DARNELL
BY Zugelter & Zugelter
Attys.

Patented June 17, 1952

2,601,099

UNITED STATES PATENT OFFICE 2,601,099

COVER FOR BAKE PAN UNITS

Jesse L. Darnell, Milford, Ohio, assignor to The Lockwood Manufacturing Company, Cincinnati, Ohio, a corporation of Ohio Application June 9, 1949, Serial No. 98,083

3 Claims. (Cl. 220—24)

This invention relates to bake pans, such as are used in commercial bakeries, and more particularly, to heavy lids or covers for such pans.

Bread bake pan units as used by commercial bakers, comprise a plurality of pans which are banded together as a strong rigid assembly. Where these pans are designed for the baking of so-called sandwich bread in which the loaves are substantially square or rectangular in transverse section, it is necessary to cover these pans with heavy lids to confine the bread dough while baking so as to make the top, sides, and bottoms of the loaves flat.

In commercial bakeries, bread is commonly baked in what are called reel type ovens. The pans containing unbaked dough are placed on the reel conveyor and, as it passes through the oven, it is baked. The baked bread is removed from the reels and another set of pans containing unbaked dough is substituted for the pans of baked bread removed from the reel.

When lids are placed over the bake pan units to confine the bread dough, as above stated, the lids are heated in the oven to the temperatures prevailing therein. The oven temperatures may range from 400° F. to 550° F. When the pans emerge from the oven, the hot lids are removed and placed on a set of pans containing cool, unbaked dough. This subjects the pans to very drastic temperature changes, with the result that there is a strong tendency for the lids to warp.

If the warping is too extreme, the lids can jam the reel of the oven by becoming lodged against some stationary part of the oven or in the reel itself. When a reel becomes jammed, the load of bread in the oven is destroyed. In addition to the loss of the bread, the oven is likely to be out of service for a period as long as thirty-six hours. During the shutdown, the oven has to be cleaned out and any broken or distorted parts repaired. Lids which warp when on bake pan units therefore present a serious problem to the commercial baker.

Bake pan lids which have been heated to a temperature of 400° to 550° F. and then placed on a cool surface—say, on a surface at room temperature—have been known to warp or twist about a diagonal as much as four to six inches out of plane of the lid. Such warping is a very serious matter and it is difficult to overcome.

An object of my invention is to provide a cover for a bake pan unit that will not warp when subjected to the temperature changes resulting from applying a hot cover to pans containing fresh dough about to enter a hot oven.

A further object of the invention is to provide a cover for bake pan units that will be substantially warp-free and not cause jamming of the reel of a bake oven as pans of bread are carried through the oven on the reel.

A still further object of the invention is to provide a weighted lid for bread bake pans having a heavy rigid rim and a relatively light spring-like panel section that can expand and contract as a spring in tension or compression and thereby rendering the lid substantially warp-free.

Figure 2:
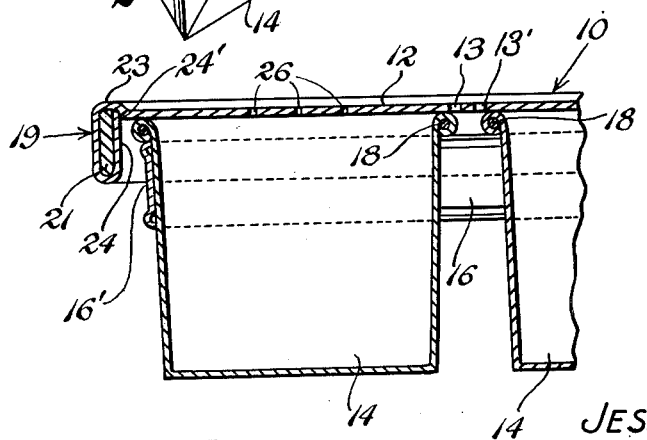

These and other objects of the invention will in part be apparent, and will in part be obvious from the following description taken in conjunction with the accompanying drawings, in which:

Fig. 1 is a view in perspective of a bake pan unit having applied thereto a lid or cover constructed in accordance with an embodiment of the invention; and Fig. 2 is an enlarged view in section taken on line II—II of Fig. 1, of a portion of the lid and some of the pans.

Throughout the specification and drawings, like reference characters indicate like parts.

In Figure 1 of the drawings, I have shown a bake pan unit comprising a plurality of bake pans 14 which are secured to band sections 16 which extend across the opposite ends of the pans and around the outer corners of the outermost pans in the unit. The ends of these band sections 16 are joined together by tie bands 16' there being one at each side of the pan unit, only one of which is shown in Figure 1. The opposite ends of the pans are secured to the band sections 16 at the locations 17. The assembly of the pans 14 and the bands 16—16' may be of the construction illustrated in the co-pending application of Jesse L. Darnell and Elbert M. Cormack, filed on the 9th day of June 1949, under Serial No. 98084, and assigned to The Lockwood Manufacturing Company, Cincinnati, Ohio. The bake pans 14, as shown by the section view in Fig. 2, are substantially square in transverse section. These pans are designed primarily for the baking of what is known as sandwich bread loaves, such loaves being customarily square or substantially square in section.

In order that the bread dough may be confined within the bread pans 14 while it is being baked, and the top surfaces of the loaves caused to be flat and not projecting above the upper edges of the pans, a lid or cover 10 embodying a form of the invention is provided. Cover 10 comprises a flat sheet metal panel 12 having a rim 19 extending around the entire periphery of the panel 12. As shown, rim 19 extends downwardly at right angles to the plane of the panel 12, so that when applied to a unit of pans 14 the rim embraces the pan unit at the top thereof. As shown in Fig. 2, the main panel 12 is of such dimensions that the rim 19 overhangs the sides and ends of the pan unit and is spaced therefrom.

When the bread dough has been placed in pans it may rise above the tops of the pans before the cover or lid 10 is applied, or the bread may rise after the lid has been placed. Therefore, it is important that the lid be heavy enough to squeeze the dough back into the pans, if it has already risen, or heavy enough to resist the lifting force of the dough against the underside of the panel 12 in the event the dough rises after the lid has been placed. To obtain the necessary weight, the rim 19 is made sufficiently heavy to confine the bread dough within the pans whether the dough rises before or after the lid is placed.

As shown, the rim 19 comprises a heavy band 21 about which the marginal edges of the panel 12 are rolled. As indicated in Fig. 2, the marginal edges are bent downwardly over the outer faces of the heavy band 21 under the bottom edge thereof and upwardly along the inner face of the rim as indicated at 24. In order to lock the flange 24 against the weight band 21, the central panel 12 is displaced bodily downward so that the upper edges of the inner flange 24 will be clinched by the adjacent marginal edges of the panel 12, as indicated at 24'.

In order to prevent warping of lid 10 about either diagonal joining the opposite corners of the lid, the main panel 12 is provided with a plurality of pairs of rows of parallel slots 13—13'. These parallel rows of slots are so located lengthwise of the main panel 12 that the panel is divided into sections S of substantially equal area. As shown, the rows of slots 13, 13' are offset with respect to each other crosswise or transversely of the main panel 12 so that the slots 13' overlap or extend across the space between adjacent ends of the slots 13 and the slots 13 overlap or extend across the space between adjacent ends of slots 13'. As indicated in Fig. 1, the space between the adjacent ends of slots 13—13 and 13'—13' is approximately equal to about one-third of the length of the respective slots. The slots 13 and 13' are spaced apart so as to provide a solid section 13a whose width is approximately equal to the width of the individual slots. The length of the space between adjacent ends of the slots 13 and 13' need not necessarily be of the order indicated, i. e., about one-third of the length of the slots, as these dimensions may vary with the thickness or gauge of the main panel 12 and the total length and width thereof. In Fig. 1, as indicated, the lid is of a size to cover four sandwich loaf bake pans 14. For a lid of this size, I have found that three sets of parallel offset or staggered slots 13, 13' are sufficient to prevent warping of the lid. The slots in the main panel cause it to act or function somewhat like a spring, the opposite ends of which are restrained by the heavy rim 19. Thus, when the lid is placed in an oven heated at a temperature of 400° F. to 550° F., the main panel will be heated more quickly, because of its thinness, to the temperature in the oven than will the rim 19. Therefore, the main panel will expand lengthwise at much higher rate than the rim. The panel having been rendered flexible by the slots, the main panel will be stressed in compression thereby offsetting the linear expansion. Likewise, when the main panel is cooled quickly from the temperature of the oven to the temperature of the unbaked bread dough, as when the lid is placed on a pan unit containing unbaked dough, the temperature of the main panel 12 will be reduced rapidly, much more so than the outer weight rim 19. Thus a situation develops where the main panel tends to contract much more rapidly than the heavy rim. Therefore the panel is stressed in tension, but the slots 13—13' allow the panel to stretch and avoid warping. This spring action of the main panel will hold the main panel in its original flat plane, so that there can be no objectionable warping of the lid about either diagonal.

The slots 13—13' are also beneficial in that they tend to relieve the lids from strains which are set up in the metal in the manufacture of the lid.

As shown in Figs. 1 and 2, the sections between rows of slots 13 and 13' are perforated, as at 26. These perforations will allow the escape of steam. However, these perforations are not essential from the standpoint of preventing warping of the lid, and may be used or not, their use being optional.

Having thus described the invention, what I claim as new and desire to secure by Letters Patent, is:

1. A substantially non-warping cover for bread bake-pan units having a plurality of pans, said cover having a flat panel adapted to lie on the top of bake pans, and a heavy rim secured to and depending from the marginal edges of said panel, said panel having at least two rows of parallel slots extending crosswise of the panel, the slots in each row being separated by metal of less width than the length of each slot, the rows of slots being spaced not less than the width of a slot, and the slots in one row being offset with respect to the slots in the other row.

2. A substantially non-warping cover for bread bake pan units having a plurality of pans, said cover having a flat, rectangular panel bounded by a heavy rim, said panel having transversely extending slots disposed in pairs of rows at uniformly spaced points lengthwise of the panel, the slots in one of the rows of each pair being offset with respect to the slots in the other row, whereby the panel is capable, without warping, of stretching when cooled from a relatively high to a relatively low temperature, and of being compressed when the panel is heated from a relatively low to a relatively high temperature, the temperature of the rim in each case remaining substantially constant compared to the temperature of the panel.

3. A substantially non-warping cover for bread bake pan units having a plurality of pans, said cover having a flat, rectangular panel bounded by a heavy rim, said panel having a plurality of groups of rows of transversely extending slots, said groups being located at uniformly spaced points lengthwise of the panel, the slots in one row of a group being offset with respect to the slots in another row of a group, whereby the panel is capable, without warping, of stretching when cooled from a relatively high to a relatively low temperature, and of being compressed when the panel is heated from a relatively low to a relatively high temperature, the temperature of the rim in each case remaining substantially constant compared to the temperature of the panel.

JESSE L. DARNELL.

REFERENCES CITED

The following references are of record in the file of this patent:

UNITED STATES PATENTS

| Number | Name | Date |
|---|---|---|
| 1,444,376 | Guyse et al. | Feb. 6, 1923 |
| 1,843,430 | Mayer | Feb. 2, 1932 |
| 2,257,468 | Langel | Sept. 30, 1941 |